United States Patent
Smith

(10) Patent No.: US 6,202,683 B1
(45) Date of Patent: Mar. 20, 2001

(54) FLUID FLOW FUSE

(75) Inventor: Robert P. Smith, Lake Forest, CA (US)

(73) Assignee: Q-Fuse, LLC, Costa Mesa, CA (US)

( * ) Notice: Subject to any disclaimer, the term of this patent is extended or adjusted under 35 U.S.C. 154(b) by 0 days.

(21) Appl. No.: 09/338,947

(22) Filed: Jun. 22, 1999

(51) Int. Cl.[7] .................................................. F16K 17/22
(52) U.S. Cl. ............................................ 137/498; 137/503
(58) Field of Search ...................... 137/505, 503, 137/462, 505.13, 498

(56) References Cited

U.S. PATENT DOCUMENTS

| | | | |
|---|---|---|---|
| 942,112 | 12/1909 | Sprecher | 137/503 |
| 2,374,568 | * 4/1945 | Terry | 137/503 |
| 4,250,915 | * 2/1981 | Rikuta | 137/501 |
| 5,722,454 | 3/1998 | Smith et al. | 137/503 |

* cited by examiner

*Primary Examiner*—Stephen M. Hepperle
(74) *Attorney, Agent, or Firm*—James G. O'Neill

(57) ABSTRACT

A fluid flow fuse has a body, which includes an inlet and an outlet with a valve seat therebetween. A valve stem having a valve member thereon is mounted in the body, and the valve member is operably connected to a diaphragm, which separates a region within the body into a pair of separate pressure chambers. Fluid passages are formed in the body communicating the separate pressure chambers with downstream pressure from the outlet and upstream pressure from the inlet. The pressure differential between the chambers is minimized so that at least one spring will normally hold the valve member in an open position, until the pressure differential reaches a predetermined amount, whereby the valve member is slowly and smoothly closed until fluid flow through the fuse is stopped. The valve seat and valve member do not form a perfectly tight seal, so as to allow some leakage, thereby allowing restricted fluid flow into the downstream side of the fuse and any system connected thereto, to equalize upstream and downstream pressures, which allows the valve to reset itself. Different types of valves, namely, sleeve valves and poppet valves, are used for different embodiments.

20 Claims, 4 Drawing Sheets

FLUID FLOW FUSE

BACKGROUND OF THE INVENTION

1. Field of the Invention

This invention relates generally to fluid control devices, and, more particularly to an improved fluid flow fuse for stopping the flow of water in a system when the water flow rate through the fuse exceeds a predetermined amount.

2. Description of Related Art

Many fluid systems, such as water sprinkler systems used on lawns, at golf courses, on freeway embankments, in housing tract common areas, in gardens, etc., are typically laid out with groups of sprinkler heads, which are controlled by one or more shutoff valves. The shutoff valves may be manual, but, in larger systems, are usually electrically operated, such as solenoid operated valves. In presently known systems, when a sprinkler head breaks or the line feeding the sprinkler heads breaks, a large flow of water results and continues until the shutoff valve for the line having the break, is closed. Many attempts have been made to solve the problems that occur when such breakage occurs to, among other things, prevent wasting water.

Known prior art devices are shown in U.S. Pat. No. 5,105,850 to Harris and U.S. Pat. No. 5,722,454 to Smith et al., which disclose valve housings having an inlet and an outlet and a valve assembly mounted in the housing to control fluid flow between the inlet and the outlet. Valve seats are mounted in the housings, and valve stem guides having a plurality of passages permitting fluid flow therethrough are also mounted in the housings. Harris includes an adjustable bolt having a hollow bolt shaft extending into the housing and the valve stem extends into the hollow bolt so as to guide the valve stem. A stop is mounted on the valve stem to limit motion of the valve stem and a spring is retained between the end of the adjusting bolt and the stop to bias the plunger away from the valve seat. The spring is arranged such that a predetermined fluid flow rate produces a force on the plunger sufficient to move it into contact with the valve seat and shut off the fluid flow. While Smith et al. includes a diaphragm wherein at least one spring and the pressure differential on each side of the diaphragm controls fluid flow through the fuse. While the devices set forth in these patents solve a number of problems, they are not optimized with respect to operating force margin, cost effectiveness, and field repair. Furthermore, the known fuses are susceptible to contaminants, friction and manufacturing tolerances.

A number of other prior art devices are known which act solely as pressure regulators of various forms and functions, while some known prior art devices control the flow of the fluid through the device. One such fluid flow device is shown in U.S. Pat. No. 4,250,915 to Rikuta, which discloses an automatic fluid control valve for maintaining a substantially constant fluid rate. This device includes a partition wall within a valve casing between a fluid inlet and a fluid outlet. A restriction-adjusting member is mounted movably in the valve casing, and includes a tapered end movable relative to a valve port in the partition wall to define a restricted passageway for fluids, with the adjacent walls of the valve port. A valve stem is movable within the casing, and has a valve thereon cooperable with the valve port to regulate the flow of fluid therethrough in response to changes in fluid pressure differential. A diaphragm is operably connected to the valve stem, and separates a region within the valve casing into a pair of pressure-differential chambers, and a fluid passage is formed in the casing communicating one pressure-differential chamber with the inlet chamber, while the other pressure-differential chamber communicates with the downstream side of the valve port. This valve, however, is always trying to maintain the same flow rate, and does not shut off flow of fluid therethrough if the downstream pressure drops dramatically.

A further prior art device is disclosed in U.S. Pat. No. 942,112 to Sprecher, which discloses a gas pressure regulator having a poppet-type valve member or plug j attached to a diaphragm 1, with a biasing means s pressed against the valve plug 1, and a continuous, elongated, restricted orifice/pressure measuring passageway r through the plug j. Sprecher, however, is drawn to a gas pressure regulator, and not a valve that automatically slowly and smoothly shuts off an excessive rate of flow of water in a sprinkler system.

Therefore, there exists a need in the art for a "water flow fuse" to accurately sense the fact that an abnormally high flow of water exists, and to then shut off the flow of water through the valve, automatically, after a built-in, mandatory time delay, and which more accurately senses and utilizes downstream pressure. With the use of improved fluid flow fuses of the present invention, which do not operate so rapidly, water hammer is avoided. Furthermore, the improved device of the present invention more smoothly controls the stopping of the fluid flow through the fuse in a more efficient manner, including using the sensed pressure downstream to more accurately control closing of the device.

SUMMARY OF THE INVENTION

It is, therefore, a general object of the present invention to provide an improved and simplified fluid flow device. It is a particular object of the present invention to provide an improved fluid flow device, which operates more smoothly. It is another particular object of the present invention to provide an improved fluid flow device utilizing downstream pressure to more accurately shut off fluid flow without water hammer. It is a further particular object of the present invention to provide an improved device, which more accurately senses and balances the flow rate of a fluid passing through the device and to more smoothly close the device when the rate of flow reaches a predetermined amount. It is a still more particular object of the present invention to provide a water flow control fuse that will close more smoothly and slowly upon sensing a rate of water flow above a predetermined amount. It is yet another particular object of the present invention to provide an improved method for operating a fluid flow device, so as to smoothly and slowly close upon sensing a rate of water flow above a predetermined amount, and which includes the use of downstream pressure in a unique manner.

And, it is a still further particular object of the present invention to provide a fluid flow device that resets itself when upstream and downstream pressures are equalized.

These and other objects and advantages of the present invention are achieved by providing a fluid flow fuse having an inlet and an outlet with a valve seat therebetween. A valve stem has a valve member thereon, and the valve member is operably connected to a diaphragm, which separates a region within a housing of the fluid flow device into a pair of pressure chambers. Fluid passages are formed in the housing communicating with both pressure chambers so that inlet pressure is sensed in one, while outlet pressure is communicated to the other. Any pressure differential between the chambers will normally hold the valve member in an open position against the action of a biasing means, until the pressure differential between the chambers reaches a predetermined amount, whereby the valve member is slowly and smoothly closed until fluid flow through the device is stopped. The valve seat and valve member do not form a perfectly tight seal so that there is some leakage therethrough to allow the valve to reset itself, after an upstream shutoff valve is shut, by allowing any trapped fluid on the upstream side of the device to bleed down, equalizing upstream and downstream pressures.

BRIEF DESCRIPTION OF THE DRAWINGS

The objects and features of the present invention, which are believed to be novel, are sent forth with particularly in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
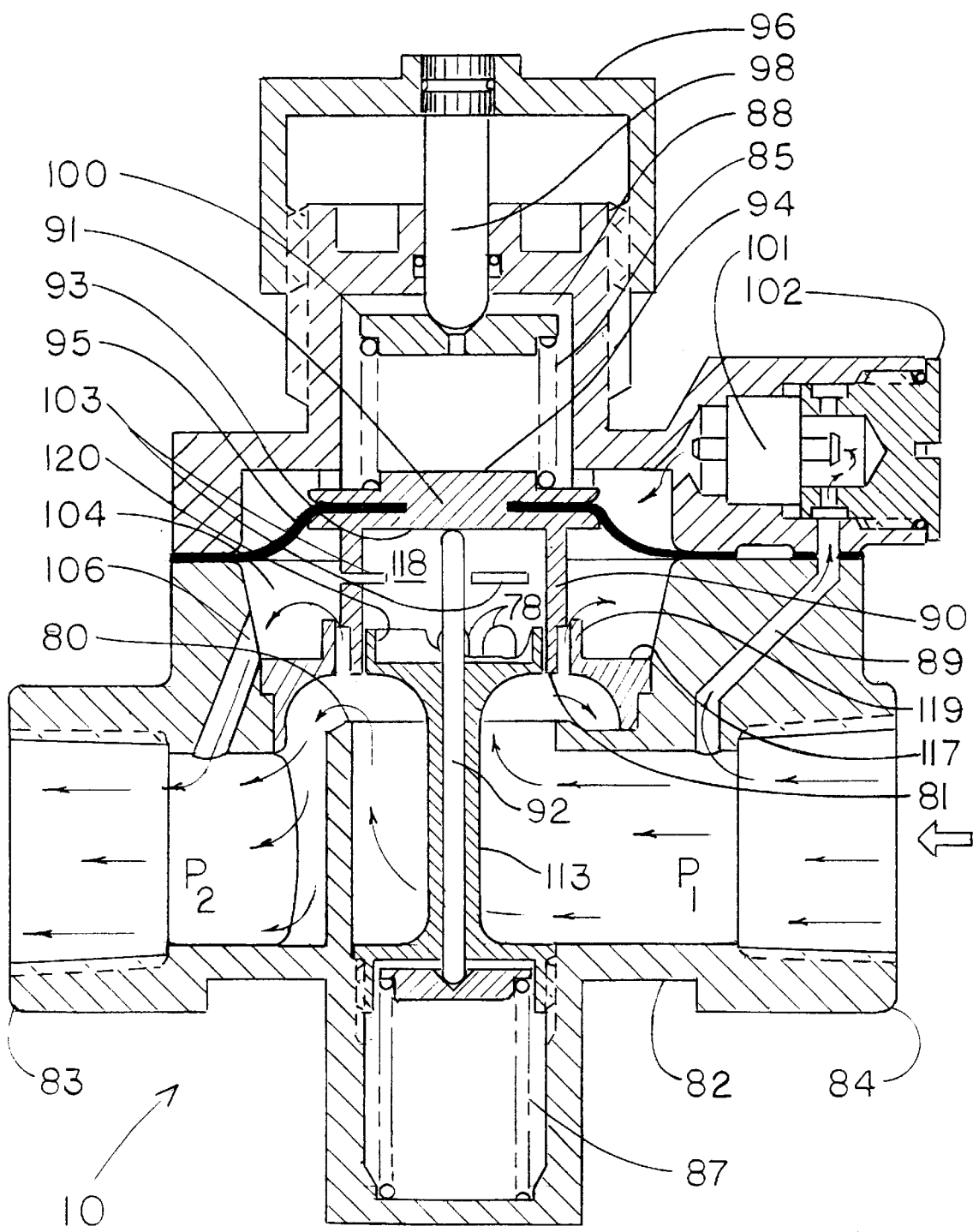
FIG. 1 is a cross sectional view of a schematic representation of one embodiment of an improved fluid flow fuse of the present invention.

The following description is provided to enable any person skilled in the art to make and use the invention, and sets forth the best modes contemplated by the inventor of carrying out his invention. Various modifications, however, will remain readily apparent to those skilled in the art, since the generic principals of the present invention have been defined herein specifically to provide for an improved fluid flow fuse.

In the drawings, each of the figures has been marked with arrows to show the direction of fluid flow. Also, upstream pressure is indicated by $P_1$, and downstream pressure by $P_2$. When fluid is flowing through the fluid flow fuse of the present invention, $P_1$ must be higher than $P_2$. Furthermore, the difference between $P_1$ and $P_2$ increases as the rate (quantity per unit of time) of flow increases. This is a fundamental principle of fluid mechanics.

The fluid flow fuses of the present invention are designed to be used in a fluid system, such as in a lawn sprinkler system. When such a system is first turned on, as by operating a shutoff valve mounted upstream of a fluid flow device, the fluid flow device will be open. As the flow rate increases through the fluid flow fuse of the present invention, the pressure difference between $P_1$ at the device inlet and $P_2$ at the device outlet, will increase with the flow. However, the pressure sensed on top of a control or operating means, such as a diaphragm, piston, or the like, will not immediately become $P_1$, as the fluid must flow through a small passageway and a restricting device connecting the same to the upstream flow. The use of this small passageway and restricting device creates a time delay. The time delay is proportional to the area of the diaphragm or other operating device used and the stroke, or how far a valve member must travel to reach a valve seat. The time delay is inversely proportional to the size of the passageway and the flow rate allowed by the restricting device.

When a steady state of flow has been reached in a fuse of the present invention, at a value below that at which the fuse has been set to close, the pressure $P_1$ will also exist in a chamber above or on top of the diaphragm, and $P_2$ will also exist downstream and on an annular area below the diaphragm. $P_1$ will also be felt upon any open central areas on the lower surface of the diaphragm and/or a valve member. The pressure difference across the annular area of the diaphragm creates a force trying to move the diaphragm connected to the valve member downward toward a valve seat. This force is opposed by a biasing means, such as a spring within the fuse. Therefore, for the normal open condition of the fuse, the biasing or spring force must be larger than the pressure forces on the diaphragm so that the valve will remain in a full open position. When fluid flow through the fluid flow fuse of the present invention increases above a predetermined amount, such as when a sprinkler head breaks off in a sprinkler system, the differential pressure force exceeds a preset spring force, and a valve member will start to close. As the valve member moves towards the valve seat, the spring is compressed, and the force it exerts increases. At the same time, since openings allowing fluid flow through the valve seat are also getting smaller, the pressure drop from $P_1$ and $P_2$ will increase. The spring rate of the spring is selected so the spring force does not increase as fast as the pressure drop force does. When this is true, the valve will close slowly, smoothly and fully.

In the fully closed position, the valve member and the valve seat are designed to cooperate so that they do not achieve a completely tight seal. This permits pressure to bleed down when the upstream shutoff valve is closed, and hence the fluid flow device of the present invention will eventually reopen.

Referring now to FIG. 1, there shown in cross section is a schematic representation of a first embodiment 10 of the improved water flow fuse of the present invention, which is less susceptible to contaminants, friction and manufacturing tolerances. It should be again pointed out that the water flow fuse 10 of the present invention is not intended for use to regulate the flow rate in a fluid system. Within a wide range of flow rates the water flow fuse of the present invention does nothing. The flow can be whatever the system demands. The fuses of the present invention, however, do recognize when a maximum permissible flow is reached. The present invention does not regulate the value of fluid flow, and does not close slightly to maintain a preset value. When, however, a preselected rate of flow is exceeded, the water flow fuses of the present invention will close entirely to stop flow. This closing will not be instantaneous, but will occur relatively slowly and smoothly, over a predetermined period of time.

As shown in FIG. 1, a valve or sleeve-type closing member 94 is in the open position in a guide 117, having a raised annular lip 119, which annular lip restricts flow past a lower end 81 of a sleeve 90, into an annular chamber 104. This is the normal position of the valve member 94 when the water flow fuse 10 has no fluid flow, and/or when a normal steady state flow passes through the water flow fuse. The valve member 94 is preferably a sleeve-type member, having an elongated, hollow cylindrical sleeve 90 secured to a closed top 91. A plurality of lower openings or slots 78 are formed in and evenly spaced around the lower end 81 of the sleeve 90. The cylindrical sleeve 90 also includes elongated slots 103 extending through the sleeve, near the closed top 91, to connect annular chamber 104 to an inner chamber 118. The lower slots 78, may take any desired form or shape, and provide the device with several advantages. First, because the sleeve valve member 94 is guided on a guide element 113, having an enlarged head 120 captured within the inner chamber 118 and a movable rod 92 within the guide element, the stroke of the valve member 94 may be long. Furthermore, the openings 78 are configured to cooperate with the enlarged head 120, to provide controlled stroke versus pressure drop characteristics, and less leakage between upstream $P_1$ and chamber 118.

The device 10 of FIG. 1 also includes a means for adjusting a bias spring 85 held in a top chamber 88. The means for adjusting includes two springs 85, 87, with an adjusting knob 96 on the top of device 10 cooperating with upper spring 85. The upper spring 85 is held in a top chamber 88, between closed top 91 and a spring plate 100. Upstream pressure $P_1$ is communicated to top chamber 88 by a narrow passageway 89 and a flow restrictor 101, sealingly held in place by a plug 102. Restrictor 101 is preferably a dripper or emitter of a well-known type, used in drip irrigation systems. This restrictor 101 consists of a maze of annular passages, arranged to inhibit flow, and which is rated for various flows at a given pressure.

The restrictor 101 is easily replaced by removal of plug 102 if, for some reason, it becomes blocked or clogged.

A second or load spring 87 is contained in an opening in a lower part of a valve housing 82, and is set or selected to control the maximum flow at which the device will be shut off. The movable central shaft or rod 92, in guide element 113, is connected between a lower surface 93 of closed top 91 and a spring plate mounted above spring 87. The spring 85 is mounted above, and acts on an upper surface of a top 91, which top is secured to diaphragm 95. The force of spring 85 is adjusted by turning the knob 96 to move a rod 98 held against spring plate or holder 100. The adjusting knob 96 moves or turns the rod 98, to move the spring holder 100. When the adjusting knob 96 is turned in one direction, the spring 85 will be compressed, and when turned in the other direction, the spring 85 will be decompressed, or released. It, therefore, can be seen that by compressing the bias spring 85, an increased force will be achieved, and the net upward force on the diaphragm and valve member 94 can be reduced, resulting in a lower fluid flow setting.

The device 10 of FIG. 1 also includes a passage 106 connected to downstream pressure $P_2$. Passage 106 is large, relative to the restricted flow paths between annular lip 119 and openings 78 in the lower end 81 of sleeve 90, and slots 103. The passage 106 allows the downstream or outlet pressure $P_2$ to enter annular chamber 104, and to act across the lower annular surface or side of the diaphragm 95.

The lower end 81 of the sleeve 90 is specifically sized, dimensioned and shaped so as to cooperate with raised annular lip 119, and to control the flow of fluid through a valve seat 80 when closed. The lower end 81 and openings 78 therein also control the pressure drop versus stroke characteristics of the device 10, and further control the time delay that may be achieved.

The fuse 10 of FIG. 1 operates as follows: the fuse is used in a fluid system, such as a sprinkler system of the type set forth in Smith et al., (U.S. Pat. No. 5,722,454), the disclosure of which patent is incorporated herein, in its entirety, by this reference thereto. When the sprinkler system is first turned on, fuse 10 will be in the open position shown in FIG. 1. As the flow rate increases, the pressure differential between $P_1$ on the upstream side, at inlet 84, and $P_2$ at the downstream side or outlet 83, will increase along with the flow. The upstream pressure of the fluid will also be transmitted to the first pressure cavity or chamber 88, formed above the diaphragm 95 in the body of device 10, via small passageway 89, and restrictor 101. Because of the sizes of the passageway 89 and the selected flow rate of restrictor 101, the pressure acting on the top or upper surface of the diaphragm in the cavity 88 does not immediately equal that of $P_1$, thus creating a time delay which may be calculated, in a manner well known to those skilled in the art, depending on various pressure and flow rates, and the size of the passageway 89 and the selected flow rate of restrictor 101.

When a steady flow rate has been reached, at a value below that at which the fluid flow fuse has been set to close, pressure $P_1$ will exist in the chamber 88, above the diaphragm. Furthermore, the downstream pressure $P_2$ will be felt in annular chamber 104 below the diaphragm 95 from the passage 106. A pressure between $P_1$ and $P_2$, but closer to $P_2$, will exist in chamber 118. These pressures, $P_1$ and $P_2$, will be substantially equal, except for the normal drop in pressure across the valve seat 80. Any differences will be made up by the springs 85 and 87. That is, the pressure within chamber 88 creates a force, which combined with spring 85 is trying to move the diaphragm 95 and the attached valve member 94 toward the valve seat 80. However, this force is opposed by the force or pressure against the lower surface of diaphragm 95 in annular chamber 104, chamber 118, and the force of the spring 87 against the pin 92, so that the valve member 94 remains in the open position. It is to be understood that all of the elements and openings of the device 10 are dimensioned and sized to close and accurate tolerances, so as to produce the most favorable results.

When the flow increases above a preselected value, such as when a head breaks off in a sprinkler system, the differential pressure force thus caused between $P_1$ and $P_2$ exceeds the preset spring force 87 and the valve member 94 will start to close. Once started, the valve member 94 will continue to close, at a predetermined rate, until it is fully closed against valve seat 80. After closure, some fluid is allowed to bleed through the valve seat since the valve seat and valve member are not completely sealed.

The operating principle of the fuses of the present invention is based on the fact that there is a mathematical relationship between the flow rate through the fuse and the pressure drop across it. The present invention succeeds in applying $P_1$ (inlet pressure) on the top of the diaphragm and as close as possible to $P_2$ (outlet pressure) on the bottom. Prior known fuses do not achieve this, but instead, apply a pressure part way between $P_1$ and $P_2$. This means that in prior art, fuses or valves the force on the diaphragm for a given flow is less than it might be and, therefore, a smaller spring force is needed. As these forces get smaller, the fuse becomes more susceptible to friction, contaminants and manufacturing tolerances. All of these traits are undesirable. Furthermore, the fuses of the present invention reduce the leak paths from the central part of the main valve, by adding raised, annular lips 119 and 120 and the passages 106 and 103, so that the pressure in annular chamber 104 and chamber 118 approaches $P_2$ more closely. Thus, with the use of the fuses of the present invention, the force put on the valve member, such as 94, at a given flow rate, is increased.

The slots 103 in sleeve 90 have a secondary effect. When the valve member 94 moves or strokes most of the way towards the closed position in valve seat 80, flow through the slots are cut off by the enlarged head 120 of guide element 113, and fluid in chamber 118 is forced to flow through the annular leak path between the guide 113 and the sleeve. Since the leak path is a smaller passage than the slots, this slows the closure, which makes water hammer less likely to occur in a system in which the valve is installed.

Figure 2:
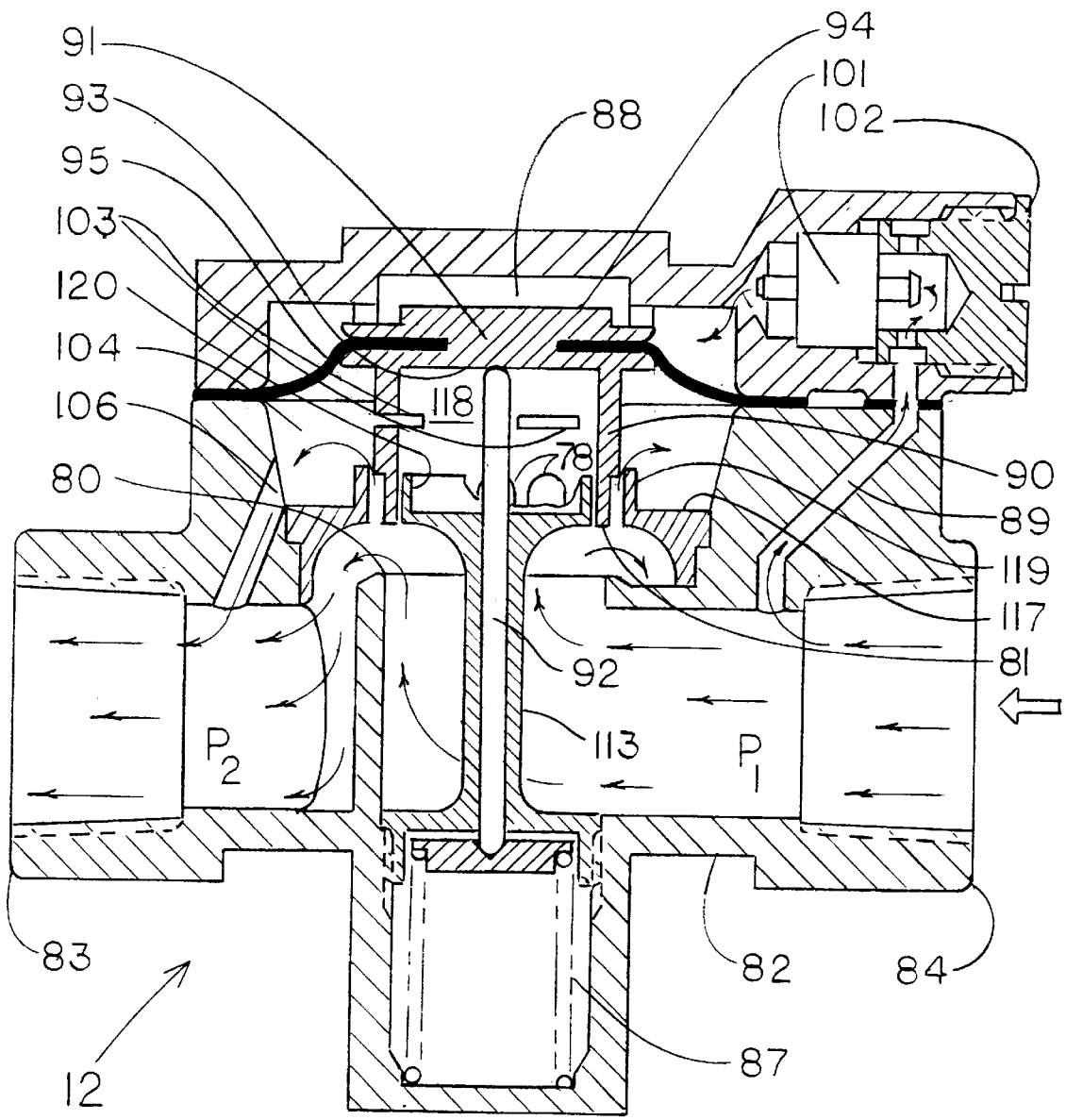
FIGS. 2–4 are cross sectional schematic views of further embodiments of the improved fluid flow fuse of the present invention.

Referring now to FIG. 2, a second embodiment of a fluid flow fuse is shown at 12. This fuse 12 is substantially identical to that shown in FIG. 1, except that it does not have an adjusting handle 96, pin 98, plate 100 and spring 85. The fluid flow fuse 12 will operate in the same manner as the device of FIG. 1.

Figure 3:
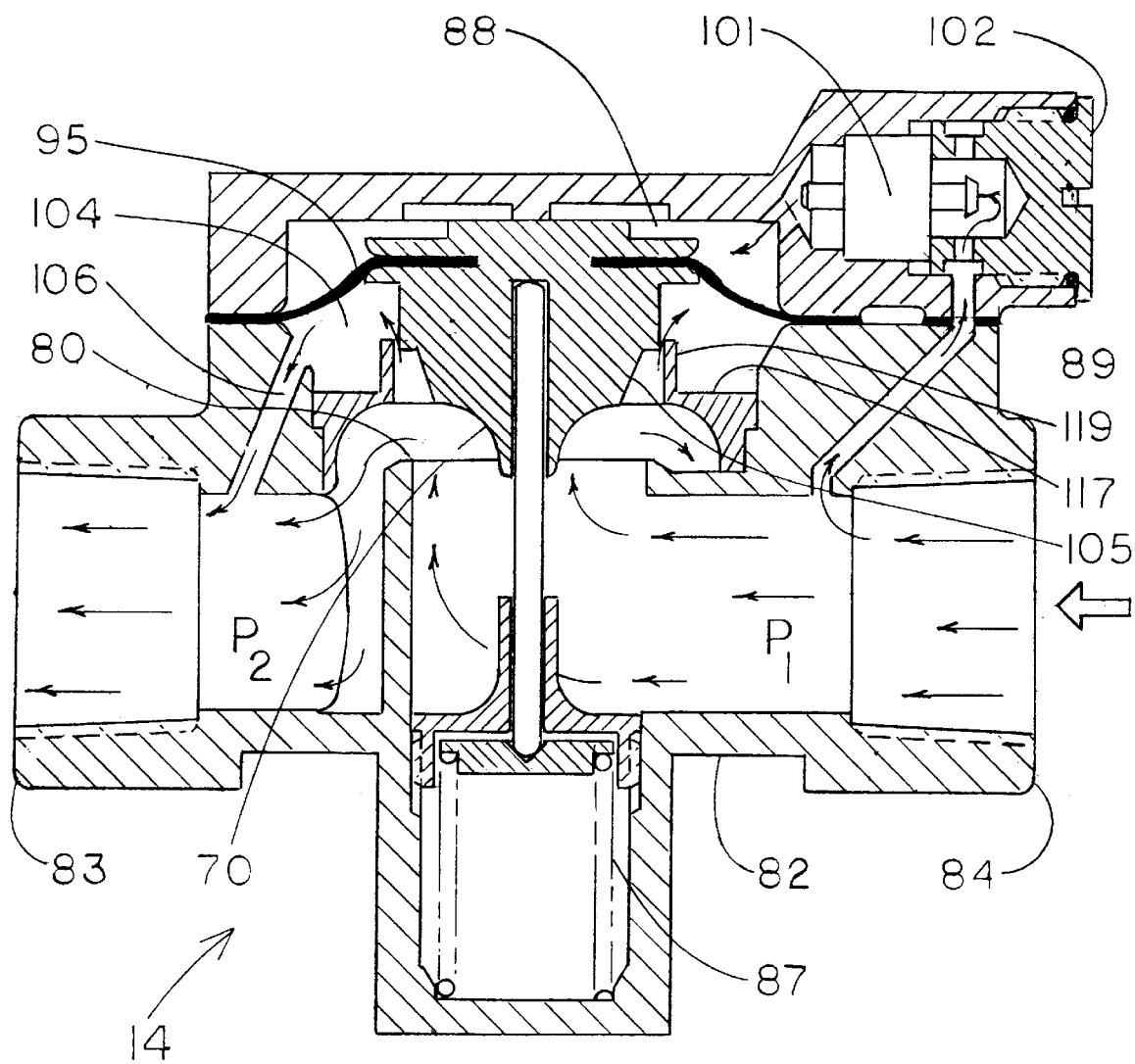

Turning now to FIG. 3, there shown is a third embodiment of a fluid flow fuse of the present invention, generally identified by the numeral 14. The body of fluid flow fuse 14 is identical to that of FIG. 2, except that a specifically shaped valve member, such as an elongated poppet valve 105, is slidably mounted therein, in place of a sleeve valve. The poppet valve includes the diaphragm 95 secured between the upper and lower portions of the housing. This poppet valve 105 will be less expensive to make, and the force balance thereon is quite different from that of sleeve valve 94. Both upstream static pressure $P_1$ and a momentum force due to turning the flow 90° is felt on a curved bottom surface 70 of poppet valve 105. The pressure ($P_1$) is also applied to the top of the diaphragm, and acts on an area equal to the sum of the poppet valve area, plus the annular area, between the poppet valve and the valve body. Inlet pressure ($P_1$) is opposed by a slightly greater pressure acting on the poppet valve area, while a lower pressure ($P_2$) acts on the bottom of the annular area of the diaphragm. For a given flow, the force to overcome the spring 87 is less than that of FIGS. 1 and 2. Since the spring force is less, the same operating drawbacks noted in the operation of the prior art are present. However, the force levels are higher than those in the known prior art. Therefore, this fuse 14 is still an improvement over that of the known prior art.

Figure 4:
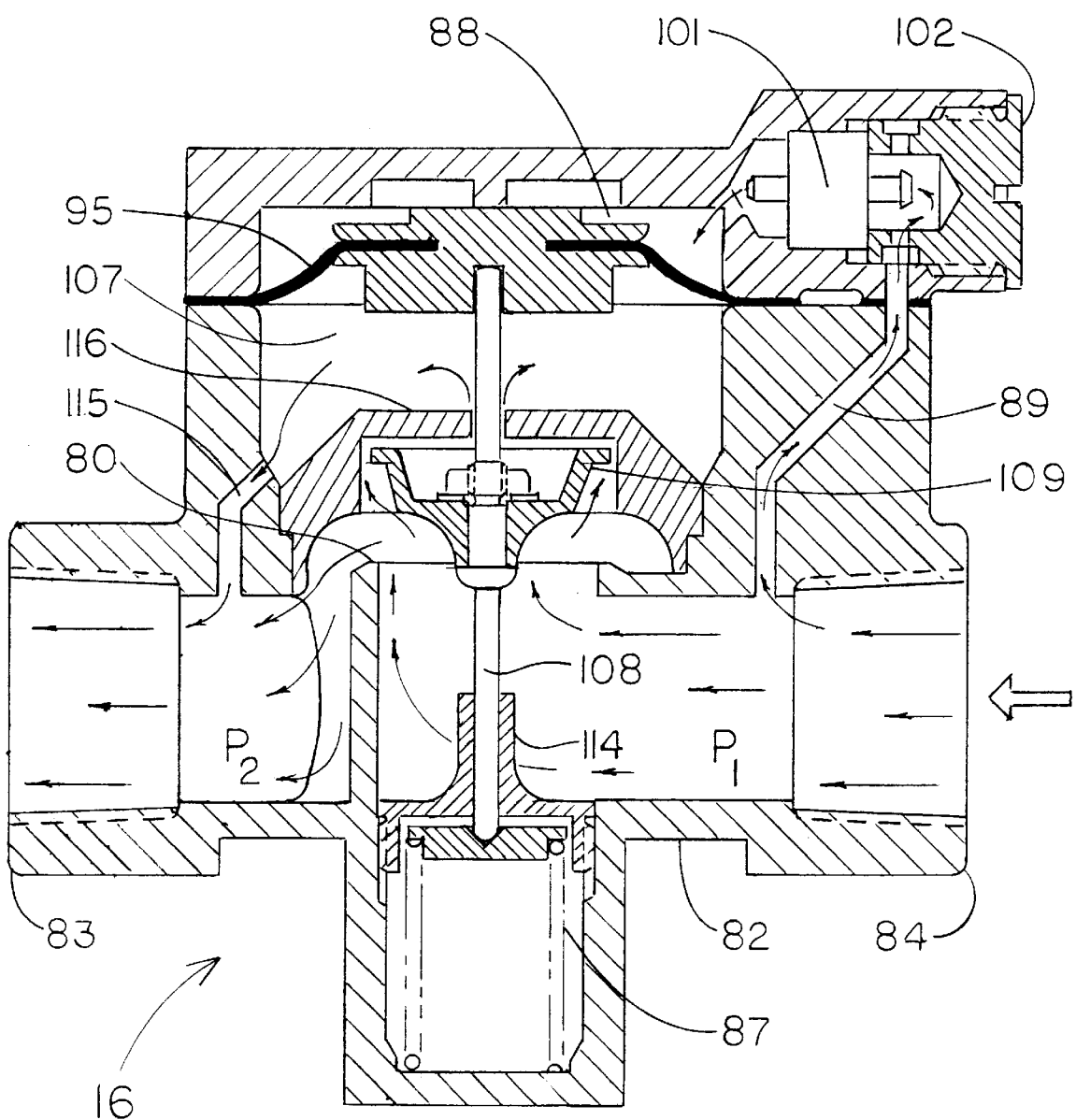

A fourth embodiment of a fluid flow fuse 16 is shown in FIG. 4. This fuse 16 is similar to that shown in FIG. 3, however, it includes a different type of poppet valve 109 in which the force balance differs from that of FIG. 3, and which is more favorable. Momentum forces impinging on the lower surface of the poppet valve 109, from turning the flow, are the same as in FIG. 3, but most of the static pressure force ($P_1$) on the poppet 109 is balanced out, as pressure exists on both sides (top and bottom), because of the loose fit of the poppet valve 109 in a barrier 116. The only difference is the pressure acting on a small cross sectional area of a rod 108 passing through a guide element 114, supporting poppet valve 109, where the rod 108 passes through a hole in the upper barrier 116.

Consequently, to have the poppet valve 109 shut off at a given flow rate, a larger spring force will be required from 87, than for the fuse of FIG. 3. In terms of operating reliability, this fuse will be closer to FIGS. 1 and 2 than to 3.

The fuse 16 has another advantage over the previously mentioned fuses. Fuses 10 and 12 each have two annular leak paths (between sleeve 90 and guide 113 and raised annular lip 119 of barrier 117) that require passage 106 to be large to compensate for them. Similarly, fuse 14 has one annular leak path between poppet valve 105 and raised annular lip 119 of barrier 117. Dirt or small changes in the diameter of the parts that establish these annular leak areas result in large (as a percentage of the area) area changes. These area changes result in changes in pressure in annular chamber 104, and, hence, in the value (set point) of the flow rate at which the respective valve member shuts. In practice, this means that the diameters must be held to close manufacturing tolerances to insure that all fuses in a production run are alike (shut at the same flow). In fuse 16, there is only one annular leak path (as in 14, also). But, this annular leak path is much smaller, about 1/10 the size of the one in 14. Hence, a change in its size has much less influence on the pressure in chamber 107, fed by a passage 115, on the set point (flow at which valve member closes). A secondary benefit is that passage 115 can be smaller than passage 106, thereby somewhat simplifying construction.

Thus, there have been described a number of embodiments of improved and simplified fluid flow fuses for use in a fluid system, such as a sprinkler system. The fluid flow fuses of the present invention are easily installed and used, and have components which may be easily removed and/or replaced if problems occur. Furthermore, the fluid flow fuses of the present invention provide a time delay when filling and/or closing the system, and allow some leakage of water after being closed to allow the fluid flow fuse to reset after upstream pressure is bled down. Finally, the fluid flow fuses of the present invention are not as susceptible to contamination, friction and manufacturing tolerances, because of the better balancing of forces and higher spring forces used therein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A fluid flow fuse for automatically shutting off an excessive rate of flow of fluid in a system, comprising:

a body having a fluid inlet passage and a fluid outlet passage, connected by a valve seat opening;

a first pressure-measuring passageway formed in the body and connected between the fluid inlet passage and a first pressure-sensing chamber;

a restrictor held in the first pressure-measuring passageway;

a valve member connected to a diaphragm and movable through a guide means between a normally open position and a closed position against the valve seat opening;

the diaphragm connected between the body and the valve member, downstream of the valve seat, above the guide means so as to form a lower annular area and a separate upper area forming the first pressure-sensing chamber;

the valve member cooperating with the guide means to form a restricted passageway between the fluid inlet passage and the lower annular area;

a second, separate pressure-measuring passageway formed in the body and connected between the fluid outlet passage and the lower annular area, between the guide means and the diaphragm;

at least one spring cooperating with the valve member, and the valve member and the at least one spring being sized and dimensioned so that when the flow of fluid through the body reaches a predetermined amount, a pressure differential will be created to slowly move the valve member through various positions to the closed position, against the valve seat, without causing water hammer; and the valve member being held in the valve seat in such a manner to allow fluid to bleed by the valve member to enable the valve member to automatically reset itself to the normally open position, when pressure applied thereto is bled away.

2. The fluid flow fuse of claim 1 wherein the valve member has a closed top attached to a cylindrical, hollow member having a plurality of slots and lower openings formed therein; the lower openings being formed at an outer end of the cylindrical, hollow member, away from the closed top; the at least one spring cooperating with an element connected to a lower surface of the closed top to bias the valve member away from the valve seat.

3. The fluid flow fuse of claim 1 wherein the valve member is a poppet valve.

4. The fluid flow fuse of claim 1 wherein the valve member has a closed top attached to a cylindrical, hollow member having a plurality of slots and lower openings formed therein; the lower openings being formed at an outer end of the cylindrical, hollow member, away from the closed top; further including a plurality of springs, a first of the plurality of springs cooperating with an actuator connected to a top surface of the closed top to bias the valve member toward the valve seat; and a second of the plurality of springs cooperating with an element connected to a lower surface of the closed top to bias the valve member away from the valve seat.

5. The fluid flow fuse of claim 4, further including an adjusting element cooperating with the first of the plurality of springs so as to adjustably control the opening characteristics of the valve member.

6. The fluid flow fuse of claim 5 wherein the adjusting element is mounted on the exterior of the body and cooperating with the first of the pair of springs, and wherein the first of the pair of springs is held in the first pressure sensing chamber above the diaphragm.

7. A water flow fuse for automatically shutting off an excessive rate of flow of water in a system, comprising:
   a valve body having a water inlet passage and a water outlet passage in fluid communication with a valve seat opening;
   a first pressure-measuring passageway formed in the valve body and connected between the water inlet passage and a first pressure-sensing chamber;
   a restrictor removably held in the first pressure-measuring passageway;
   a valve member connected to a diaphragm and moveable through a guide element between a normally open position and a closed position against the valve seat opening;
   the diaphragm sealingly connected between the valve body and the valve member, downstream of the valve seat, above the guide element so as to form a second annular pressure-sensing area subject to downstream pressure in the water outlet passage and a separate upper are forming the first pressure-sensing chamber;
   a second, separate pressure-measuring passageway formed in the body and connected between the fluid outlet passage and the second annular pressure-sensing area, between the guide element and the diaphragm;
   at least one spring cooperating with the valve member, and the valve member and the at least one spring being sized and dimensioned so that when the flow of water through the body reaches a predetermined amount, a pressure differential will be created to slowly and smoothly move the diaphragm and the valve member through a number of flow controlling positions to a closed position against the valve seat without causing water hammer; and
   the valve member including a closed top portion and a bottom portion, with the closed top portion formed at a first of two ends; and the bottom portion being specifically shaped and formed at a second of two ends, and cooperating with the guide element to form a restricted passageway between the water inlet passage and the second annular pressure-sensing area; and the valve member loosely cooperating with the valve seat in the closed position so as to allow some leakage of water thereby, to enable the valve member to automatically reset itself to the normally open position when pressure applied thereto has been relieved.

8. The fluid flow fuse of claim 7 wherein the valve member is a poppet valve, and the bottom portion is curved.

9. The fluid flow fuse of claim 7 wherein the closed top portion has a lower surface an and upper surface, and a first spring cooperates with the upper surface of the closed top portion to bias the valve member toward the valve seat and a second spring cooperates with an element connected to the lower surface of the closed top portion to bias the valve member away from the valve seat; and further including an adjusting knob cooperating with the first spring so as to adjustably control the opening characteristics of the sleeve valve member.

10. The fluid flow fuse of claim 8 wherein the adjusting knob is mounted on the exterior of the valve body and cooperates with the first spring, and wherein the first spring is held in the first pressure-sensing chamber above the diaphragm.

11. The fluid flow fuse of claim 7 wherein the valve member is a combination poppet and sleeve valve member having a cylindrical, hollow element with two ends; a closed top is formed at a first of the two ends, and a plurality of openings are formed at a second of the two ends; and further including a plurality of slots formed in the cylindrical hollow element between the two ends.

12. A water flow fuse for automatically shutting off an excessive rate of flow of water in a system, comprising:
   a valve body having a water inlet passage and a water outlet passage in fluid communication with a valve seat opening;
   a first pressure-measuring passageway formed in the valve body and connected between the water inlet passage and a first pressure-sensing chamber;
   a dripper removably and sealingly held in the first pressure-measuring passageway to control flow of fluid therethrough;
   a combination poppet and sleeve valve member connected to a diaphragm moveble between a normally open position and a closed position against the valve seat opening; the combination poppet and sleeve valve member including a cylindrical, hollow element having two ends with a closed top protion formed at a first of the two ends, and a plurality of openings formed at a second of the two ends; the diaphragm sealingly connected between the valve body and the top closed portion of the combination poppet and sleeve valve member, downstream of the valve seat, above a guide element, so that a lower area of
   the diaphragm forms an annular fluid chamber downstream of the valve seat opening that is subject to varying pressures adjacent the water outlet passage, and a separate upper area of the diaphragm forms a portion of the first pressure-sensing chamber;
   a second pressure-measuring passageway formed in the body and connected between the fluid outlet passage and the annular fluid chamber between the guide element and the diaphragm;
   at least one spring cooperating with the combination poppet and sleeve valve member; and the combination poppet and sleeve valve member and the at least one spring being sized and dimensioned so that when a predetermined pressure differential is sensed, the combination poppet and sleeve valve member is moved from a full open position toward a closed position; and whereby, in the full open position, the plurality of openings formed at the second of the two ends communicates between a volume of water within said cylindrical, hollow element and an annular volume of water within the fluid chamber; and when in a partially closed position, the plurality of openings formed at the second of the two ends communicate upstream water pressure with downstream water pressure, while the slots are blocked by an enlarged head on the guide element, thereby slowing travel of the combination poppet and sleeve valve member toward the valve seat; and the combination poppet and sleeve valve member is finally moved to the fully closed position against the valve seat, without causing water hammer; after the slots are blocked; and the combination poppet and sleeve valve member loosely cooperating with said valve seat in said fully closed position so as to allow some leakage of water by the combination poppet and sleeve member, to enable the combination poppet and sleeve valve member to automatically reset itself to the normally open position when pressure applied thereto has been relieved.

13. The water flow fuse of claim 12, further including an adjusting knob cooperating with the at least one spring so as to adjustably control the opening characteristics of the valve member.

14. The water flow fuse of claim 13 wherein the adjusting knob is mounted on the exterior of the valve body and cooperating with the at least one spring, and wherein at least one spring is held in the first sensing chamber above said diaphragm.

15. The water flow fuse of claim 12, further including a second spring cooperating with a slidable rod, which slidable rod contacts a lower surface of the closed top portion to bias the combination poppet and sleeve valve member away from the valve seat.

16. The water flow fuse of claim 15, further including an adjusting knob cooperating with a first spring so as to adjustably control the opening characteristics of the valve member.

17. The water flow fuse of claim 16 wherein the adjusting knob is mounted on the exterior of the valve body and cooperating with the first spring, and wherein the first spring is held in the first sensing chamber above said diaphragm.

18. The fluid flow fuse of claim 2 wherein the guide means is a barrier between the poppet valve and the diaphragm.

19. The fluid flow fuse of claim 8 wherein the guide element is a barrier between the poppet valve and the diaphragm.

20. The water flow fuse of claim 19 wherein the poppet valve includes a rod which loosely passes through an opening formed in the barrier.

* * * * *